United States Patent
Choi (10) Patent No.: US 9,399,442 B2
(45) Date of Patent: Jul. 26, 2016

(54) ASSEMBLING APPARATUS OF CURTAIN AIRBAG

(71) Applicants: HYUNDAI MOTOR COMPANY, Seoul (KR); Kia Motors Corporation, Seoul (KR)

(72) Inventor: Jae Ho Choi, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 14/712,791

(22) Filed: May 14, 2015

(65) Prior Publication Data

US 2016/0114758 A1    Apr. 28, 2016

(30) Foreign Application Priority Data

Oct. 27, 2014    (KR) .......................... 10-2014-0146257

(51) Int. Cl.
*B60R 21/276* (2006.01)
*B60R 21/232* (2011.01)

(52) U.S. Cl.
CPC .............. *B60R 21/276* (2013.01); *B60R 21/232* (2013.01)

(58) Field of Classification Search
CPC ............................ B60R 21/276; B60R 21/232
See application file for complete search history.

(56) References Cited

U.S. PATENT DOCUMENTS

| 7,677,595 | B2* | 3/2010 | Dominissini | B60R 21/217 248/200 |
| 7,862,075 | B2* | 1/2011 | Minamikawa | B60R 21/213 280/728.2 |
| 8,007,000 | B2* | 8/2011 | Gammill | B60R 21/232 280/730.2 |
| 2008/0252047 | A1* | 10/2008 | Fink | B60R 21/213 280/728.2 |
| 2013/0214514 | A1* | 8/2013 | Ochiai | B60R 21/232 280/728.2 |

FOREIGN PATENT DOCUMENTS

| JP | 2002-053003 A | 2/2002 |
| JP | 2006-015847 A | 1/2006 |
| JP | 2007-283930 A | 11/2007 |
| JP | 2009-226957 A | 10/2009 |
| JP | 2014-180925 A | 9/2014 |
| KR | 10-2009-0117447 A | 11/2009 |
| KR | 10-2009-0132940 A | 12/2009 |
| KR | 10-1003920 B1 | 12/2010 |

* cited by examiner

*Primary Examiner* — Faye M Fleming
(74) *Attorney, Agent, or Firm* — McDermott Will & Emery LLP (57) ABSTRACT

An assembling apparatus of a curtain airbag in a vehicle includes an inflator and an airbag cushion. The airbag cushion includes a body part configured to be unfolded if necessary to protect a passenger, an inlet configured to transmit air from the inflator into the body part, and a first extending part having a predetermined length and extending from the inlet towards the inflator side of the inlet. Also included are at least one bracket on which the inflator is supported and at least one fixed member configured to fix the inflator, enclosing an outside of the inflator.

10 Claims, 7 Drawing Sheets

FIG. 1

(RELATED ART)

View A

ASSEMBLING APPARATUS OF CURTAIN AIRBAG

CROSS REFERENCE TO RELATED APPLICATION

The present application claims priority to Korean Patent Application No. 10-2014-0146257, filed Oct. 27, 2014, the entire contents of which is incorporated herein for all purposes by this reference.

TECHNICAL FIELD

The present invention relates to an assembling apparatus of a curtain airbag which is coupled with a vehicle body to unfold an airbag cushion if necessary so as to protect a side of a passenger.

BACKGROUND

Generally, a curtain airbag is to protect a driver and passengers from a side collision of a vehicle and has a structure in which when gas of an inflator is exploded by a collision signal, a curtain airbag is expanded by the exploded gas.

Figure 1:
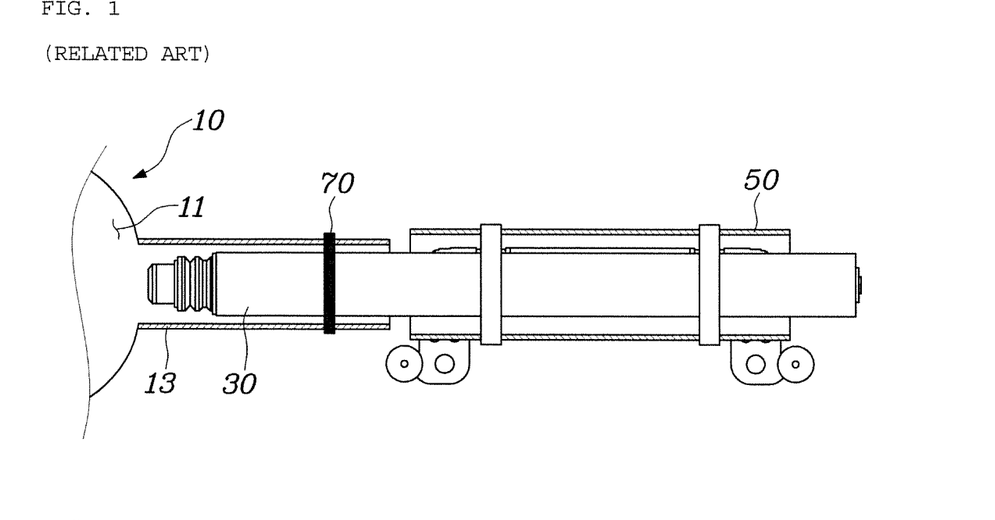
FIG. 1 is a view illustrating an assembling apparatus of a curtain airbag according to the related art.

FIG. 1 is a diagram illustrating a curtain airbag for a vehicle according to the related art, in which a front side of an inflator 30 is inserted into an inlet 13 of an airbag cushion 10 and a fixed member 70 fixes the inflator 30 and the inlet 13, enclosing outsides of the inflator 30 and the inlet 13. Further, a rear side of the inflator 30 is supported to a bracket 50 and the bracket 50 is supported to a vehicle body.

However, in the case of the structure as described above, when air is injected into a body part 11 of the airbag cushion 10 at a high pressure by the inflator 30, the fixed member 70 positioned at the front side thereof does not overcome a pressure generated from the inflator 30 and is separated from the inflator 30 along with the inlet 13 and thus the airbag cushion 10 is not normally unfolded, such that the passengers may not be efficiently protected.

Therefore, a need exists for an assembling apparatus of a curtain airbag capable of safely and effectively protecting passengers by preventing an inflator from separating from an airbag cushion so as to normally unfold the airbag cushion, when there is a need to unfold the airbag cushion.

The matters described as the related art have been provided only for assisting in the understanding for the background of the present invention and should not be considered as corresponding to the related art known to those skilled in the art.

SUMMARY

An object of the present invention is to provide an assembling apparatus of a curtain airbag capable of safely and effectively protecting passengers by preventing an inflator from separating from an airbag cushion so as to normally unfold the airbag cushion, when there is a need to unfold the airbag cushion.

According to an exemplary embodiment of the present invention, an assembling apparatus of a curtain airbag may include an inflator and an airbag cushion. The airbag cushion may include a body part configured to be unfolded if necessary to protect a passenger and an inlet configured to transmit air from the inflator into the body part. The inlet may have a body part side and an opposing inflator side. The airbag cushion may also include a first extending part having a predetermined length extending from the inlet towards the inflator side. The assembling apparatus may also include at least one bracket on which the inflator is supported, and at least one fixed member configured to fix the inflator, enclosing an outside of the inflator.

In certain embodiments, the bracket is provided with a first through hole, and the first extending part of the airbag cushion may penetrate the first through hole.

In certain embodiments, the first extending part may penetrate the first through hole via a gap between the inflator and the bracket and may be bent towards the body part to be fixed to the inflator by the fixed member.

In certain embodiments, the first extending part may penetrate the first through hole via a gap between the inflator and the bracket, an end of the first extending part may be bent by a predetermined length, and the bent portion may be sewn to form a thickness increasing part having a predetermined thickness.

In certain embodiments, the airbag cushion further includes a second extending part, and the first and second extending parts may be disposed on opposing sides of the inflator. First and second through holes corresponding to the first and second extending parts may be each disposed on opposing sides the bracket, and the first extending part may penetrate through the upper first through hole and may be bent towards the body part. The second extending part may penetrate through the second through hole and may be bent towards the body part. The first and second extending parts may be simultaneously fixed by the fixed member.

In certain embodiments, the bracket may include a coupling part coupling the bracket to a vehicle body. In certain embodiments, the first extending part may be disposed under the inflator and fixed by being wound around the coupling part of the bracket. In certain embodiments, a through hole may be disposed under the bracket, and the first extending part may penetrate the through hole via a gap between the inflator and the bracket. In certain embodiments, the first extending part may extend over the whole outer peripheral surface of the inlet.

In certain embodiments, the at least one bracket may be include a first bracket in front of the inflator and a second bracket in back of the inflator and a through hole may be formed by a gap between the first bracket and the second bracket.

In certain embodiments, the at least one fixed member may include two or more fixed members spaced apart from each other. In certain embodiments, there may be three fixed members.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, an assembling apparatus of a curtain airbag according to exemplary embodiments of the present invention will be described with reference to the accompanying drawings.

FIGS. 2 to 12 are side views schematically illustrating an assembling apparatus of a curtain airbag according to exemplary embodiments of the present invention. Here, the assembling apparatus of a curtain airbag according to exemplary embodiments of the present invention includes: an airbag cushion 100 configured to include a body part 110 which is equipped in a vehicle and is unfolded to protect passengers if necessary, an inlet 130 configured to inject air generated from the inflator 300 into the body part 110, and a first extending part 150 configured to extend from the inlet 130 side to the inflator 300 side by a predetermined length; a bracket 500 on which the inflator 300 is supported; and at least one fixed member 700 configured to fix the inflator 300, enclosing an outside of the inflator 300. Further, the bracket 500 is provided with a first through hole 510 at a point corresponding to the first extending part 150 of the airbag cushion 100 first through hole, and thus the first extending part 150 is formed to penetrate through the first through hole 510.

When a shock is applied to the vehicle body by a vehicle collision, and the like, the airbag cushion 100 may be, in particular, a curtain airbag unfolded to protect a side of a passenger, among airbags unfolded depending on a predetermined condition. Generally, the airbag cushion 100 is fixed to a vehicle body, being folded at a predetermined size and is unfolded when there is a need to protect a passenger. To help understanding of embodiments of the present invention, the body part 110 protecting passengers by substantially unfolding the airbag cushion 100, the inlet 130 injecting an air generated from the inflator 300 into the body part 110, and the first extending part 150 extending from the inlet 130 to have a predetermined width and length are separately described. Further, the air generated from the inflator 300 is injected into the body part 110 through the inlet 130 to unfold the airbag cushion 100, and a connection relationship among the airbag cushion 100, the bracket 500, and the inflator 300 will be described in more detail with reference to the drawings.

First Exemplary Embodiment

Figure 2:
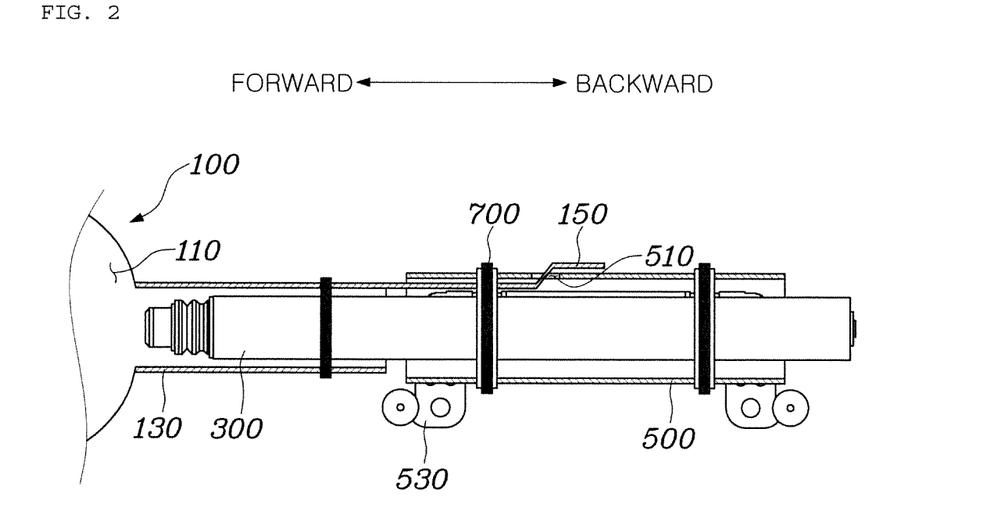
FIGS. 2 to 12 are views illustrating an assembling apparatus of a curtain airbag according to an exemplary embodiment of the present invention.

As illustrated in FIG. 2, one side of the body part 110 of the airbag cushion 100 is provided with the inlet 130, the inlet 130 has the inflator 300 inserted thereinto, and the inflator 300 is supported by the bracket 500 at an outside of the inlet 130. That is, the inlet 130 has the inflator 300 inserted thereinto but does not have the bracket 500 inserted thereinto. The first extending part 150 having a predetermined length and width is disposed over the inlet 130 and is inserted between the inflator 300 and the bracket 500 and then penetrates through the first through hole 510.

When there is more than one fixed member 700, the fixed members 700 may be spaced apart from each other, enclosing the outside of the inflator 300. FIGS. 2-12 show exemplary embodiments of the present invention having fixed members 700 disposed at three positions of a front side, a central side, and a rear side but the number, shape, and material of fixed members may be changed without limit depending on a design or an environment.

Therefore, according to the first exemplary embodiment, the fixed member 700 at the front side fixes the inflator 300 and the inlet 130 disposed at the outside of the inflator 300, enclosing the inflator 300 and the inlet 130 from the outermost side. The fixed member 700 at the central side fixes the inflator 300, the first extending part 150 disposed at the outside of the inflator 300, and the bracket 500 disposed at an outside of the first extending part 150, enclosing the inflator 300, the first extending part 150, and the bracket 500 from the outermost side, The fixed member 700 at the rear side fixes the inflator 300 and the bracket 500 supporting the inflator 300, enclosing the inflator 300 and the bracket 500 from the outermost side. As the fixed member 700, a 1-ear clamp or a band-it clamp may be used, for example, but the fixed member 700 is not limited thereto.

By the above manner, when the airbag cushion 100 is assembled with the inflator 300, the first extending part 150 of the airbag cushion 100 adheres face-to-face between the inflator 300 and the bracket 500, such that the airbag cushion 100 may be strongly bonded with the inflator 300. Further, the plurality of fixed members 700 may be provided in plural if necessary without regard to the position, thereby increasing the assembling force between the airbag cushion 100 and the inflator 300.

Further, even though the airbag cushion 100 is expanded by the inflator 300 due to the instant pressure generated when the airbag cushion 100 is unfolded, the bracket 500 is fixed to the vehicle body, the inflator 300 is fixed to the bracket 500, and the airbag cushion 100 penetrates through the first through hole 510 via the gap between the inflator 300 and the bracket 500 and is then supported by the fixed member 700, thereby preventing the airbag cushion 100 from separating from the inflator 300 by the pressure.

Second Exemplary Embodiment

Figure 3:
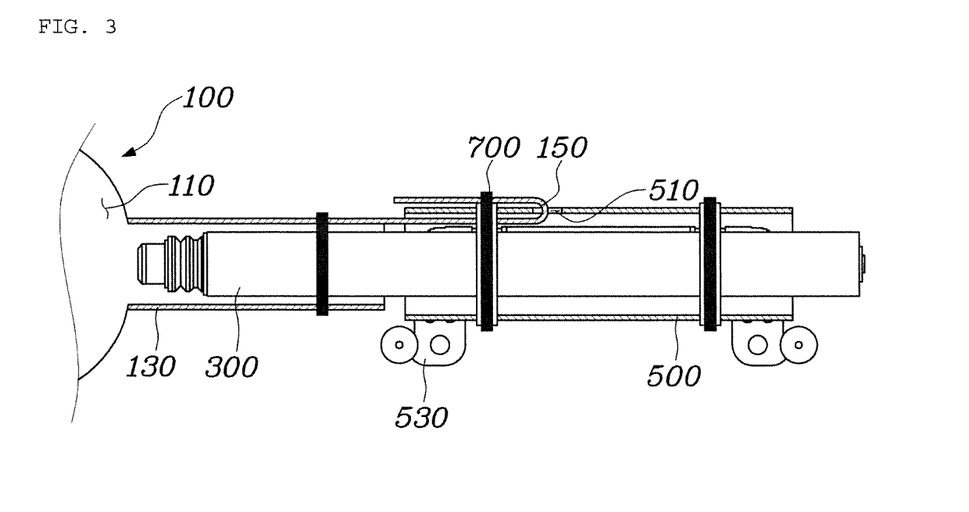

As illustrated in FIG. 3, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130 and is inserted between the inflator 300 and the bracket 500 and then penetrates through the first through hole 510. Next, the first extending part 150 is again bent forward, and thus, together with the outsides of the inflator 300 and the bracket 500, the outside thereof is enclosed by the fixed member 700 in the state in which the first extending part 150 is folded. As the result, the first extending part 150 is fixed doubly to increase the assembling force between the inflator 300 and the airbag cushion 100.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the first extending part 150 disposed at the outside of the inflator 300, the bracket 500 disposed at an outside of the first extending part 150, and the first extending part 150 bent from the outside of the bracket 500, enclosing the inflator 300, the first extending part 150, the bracket 500, and the first extending part 150 from the outermost side, and the fixed member 700 at the rear side fixes the inflator 300 and the bracket 500 supporting the inflator 300, enclosing the inflator 300 and the bracket 500 from the outermost side.

Third Exemplary Embodiment

Figure 4:
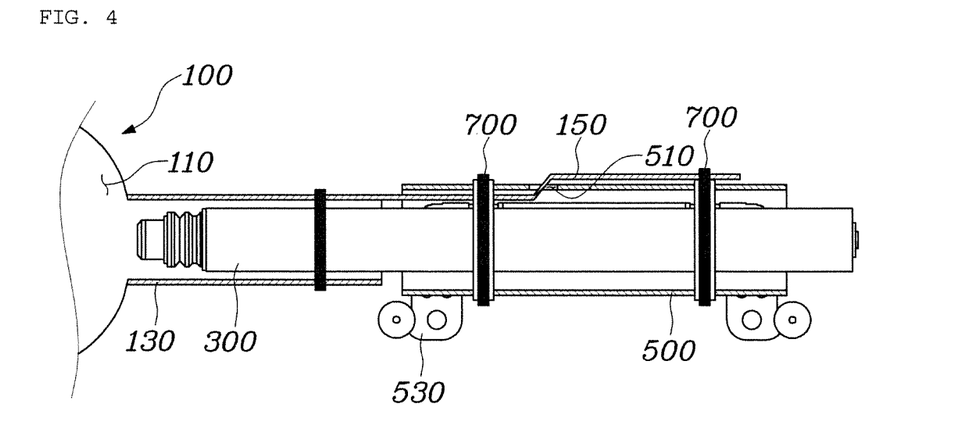

As illustrated in FIG. 4, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130, and the first extending part 150 is inserted between the inflator 300 and the bracket 500 and then penetrates through the first through hole 510 and is fixed at the outside of the bracket 500 by the fixed member 700 at the rear side. That is, the first extending part 150 according to the third exemplary embodiment is formed to be longer than the first extending part 150 according to the first exemplary embodiment and is thus fixed once more by the fixed member 700 at the rear side of the bracket 500.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the first extending part 150 disposed at the outside of the inflator 300, the bracket 500 disposed at the outside of the first extending part 150, enclosing the inflator 300, the first extending part 150, and the bracket 500 from the outermost side, and the fixed member 700 at the rear side fixes the inflator 300, the bracket 500 supporting the inflator 300, and the first extending part 150 disposed at the outside of the bracket 500, enclosing the inflator 300, the bracket 500, and the first extending part 150 from the outermost side, thereby increasing the assembling force between the airbag cushion 100 and the inflator 300.

Fourth Exemplary Embodiment

Figure 5:
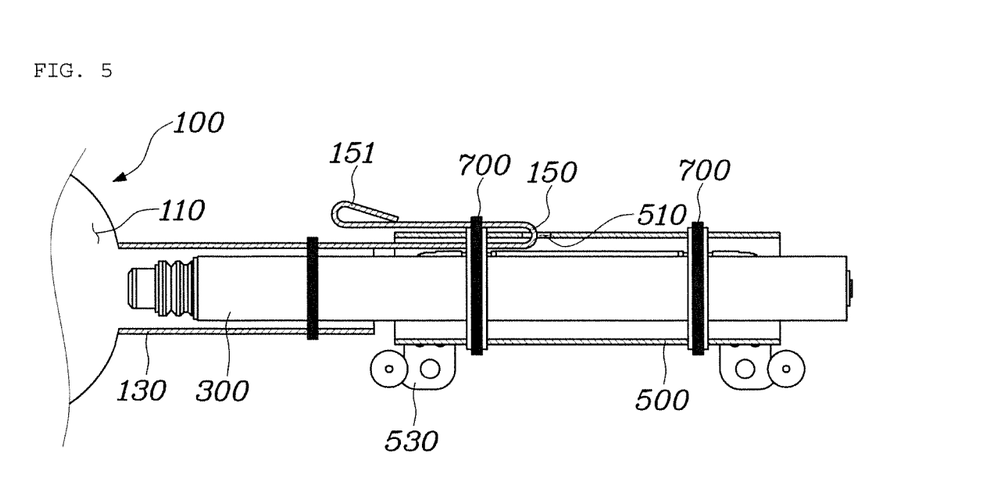

As illustrated in FIG. 5, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130 and is inserted between the inflator 300 and the bracket 500 and then penetrates through the first through hole 510. Next, the first extending part 150 is again bent forward to be folded and then an end of the first extending part 150 is again bent backward by a predetermined length and then the bent portion is sewed to form a thickness increasing part 151 forming a predetermined thickness. By this configuration, the thickness increasing part 151 fixes the fixed member 700 to prevent the first extending part 150 from separating, thereby preventing the airbag cushion 100 from separating from the inflator 300.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the first extending part 150 disposed at the outside of the inflator 300, the bracket 500 disposed at an outside of the first extending part 150, and the first extending part 150 bent from the outside of the bracket 500, enclosing the inflator 300, the first extending part 150, the bracket 500, and the first extending part 150 from the outermost side, and the fixed member 700 at the rear side fixes the inflator 300 and the bracket 500 supporting the inflator 300, enclosing the inflator 300 and the bracket 500 from the outermost side. Therefore, the assembling force between the airbag cushion 100 and the inflator 300 is increased by the first extending part 150 and the fixed member 700, in particular, the thickness increasing part 151 having the increased thickness prevents the inflator 300 from easily separating from the airbag cushion 100.

Fifth Exemplary Embodiment

Figure 6:
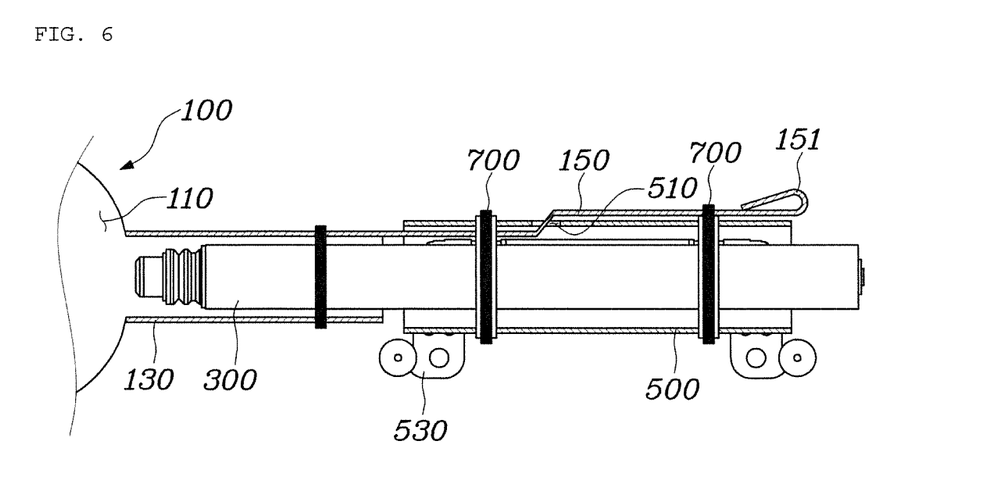

As illustrated in FIG. 6, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130 and is inserted between the inflator 300 and the bracket 500 and then penetrates through the first through hole 510. Next, the first extending part 150 is extended backward and then the end of the first extending part 150 is again bent forward by a predetermined length and then the bent portion is sewed to form the thickness increasing part 151 forming a predetermined thickness. By this configuration, the thickness increasing part 151 prevents the airbag cushion 100 from separating from the inflator 300. That is, in the state of the third exemplary embodiment, the first extending part 150 is provided with the thickness increasing part 151 at which the end of the first extending part 150 is bent and sewed.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the first extending part 150 disposed at the outside of the inflator 300, the bracket 500 disposed at the outside of the first extending part 150, enclosing the inflator 300, the first extending part 150, and the bracket 500 from the outermost side, and the fixed member 700 at the rear side fixes the inflator 300, the bracket 500 supporting the inflator 300, and the first extending part 150 disposed at the outside of the bracket 500, enclosing the inflator 300, the bracket 500, and the first extending part 150 from the outermost side, thereby increasing the assembling force between the airbag cushion 100 and the inflator 300.

Sixth Exemplary Embodiment

Figure 7:
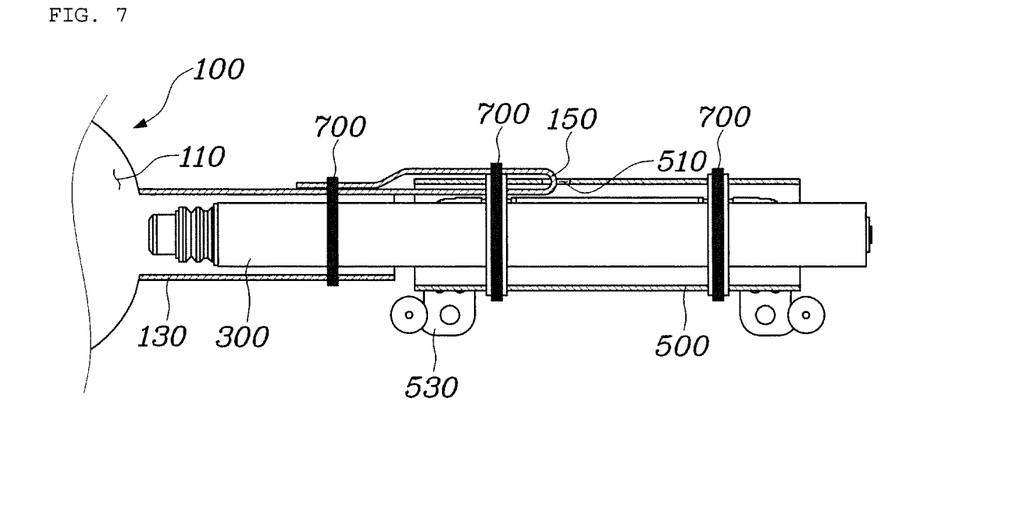

As illustrated in FIG. 7, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130 and is inserted between the inflator 300 and the bracket 500 and then penetrates through the first through hole 510. Next, the first extending part 150 is again bent forward and thus together with the outsides of the inflator 300 and the inlet 130, the outside thereof is enclosed by the fixed member 700 in the folded state, such that the first extending part 150 is fixed doubly by the fixed member 700. That is, the first extending part 150 is formed to be longer than in the second exemplary embodiment and thus longer extends forward.

As described in the first exemplary embodiment, an example in which the fixed member 700 is disposed at three positions of the front side, the central side, and the rear side will be described. Therefore, the fixed member 700 at the front side fixes the inflator 300, the inlet 130 disposed at the outside of the inflator 300, and the bent first extending part 150 disposed at the outside of the inlet 130, enclosing the inflator 300, the inlet 130, and the first extending part 150 from the outermost side, the fixed member 700 at the central side fixes the inflator 300, the first extending part 150 disposed at the outside of the inflator 300, the bracket 500 disposed at the outside of the first extending part 150, and the first extending part 150 bent from the outside of the bracket 500, enclosing the inflator 300, the first extending part 150, the bracket 500, and the first extending part 150 from the outermost side, and the fixed member 700 at the rear side fixes the inflator 300 and the bracket 500 supporting the inflator 300, enclosing the inflator 300 and the bracket 500 from the outermost side. Therefore, the first extending part 150 is fixed doubly by the fixed member 700, thereby increasing the assembling force between the airbag cushion 100 and the inflator 300.

Seventh Exemplary Embodiment

Figure 8:
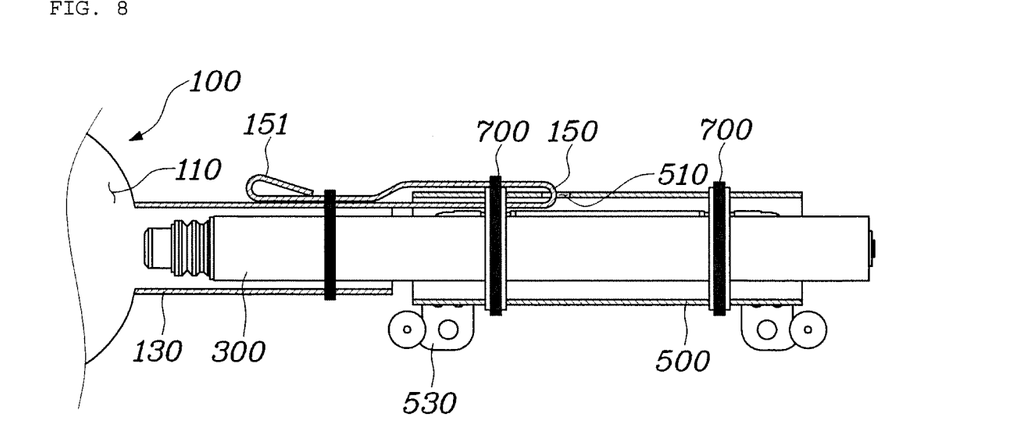

As illustrated in FIG. 8, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed over the inlet 130, inserted between the inflator and the bracket, and then penetrates through the first through hole. Next, the first extending part 150 is again bent forward to be folded, the end of the first extending part 150 is again bent backward by a predetermined length and then the bent portion is sewed to form the thickness increasing part 151 forming a predetermined thickness. By this configuration, the thickness increasing part 151 prevents the airbag cushion 100 from separating from the inflator 300. That is, the length of the first extending part 150 is longer in the fourth exemplary embodiment and thus is fixed to the inflator 300 and the inlet 130 by the fixed member 700.

As described in the first exemplary embodiment, an example in which the fixed member 700 is disposed at three positions of the front side, the central side, and the rear side will be described. Therefore, the fixed member 700 at the front side fixes the inflator 300, the inlet 130 disposed at the outside of the inflator 300, and the bent first extending part 150 provided with the thickness increasing part 151 at the outside of the inlet 130, enclosing the inflator 300, the inlet 130, and the first extending part 150 from the outermost side, the fixed member 700 at the central side fixes the inflator 300, the first extending part 150 disposed at the outside of the inflator 300, the bracket 500 disposed at an outside of the first extending part 150, and the first extending part 150 bent from the outside of the bracket 500, enclosing the inflator 300, the first extending part 150, the bracket 500, and the first extending part 150 from the outermost side, and the fixed member 700 at the rear side fixes the inflator 300 and the bracket 500 supporting the inflator 300, enclosing the inflator 300 and the bracket 500 from the outermost side. Therefore, the assembling force between the airbag cushion 100 and the inflator 300 is increased by the thickness increasing part 151 having the increased thickness, and at the same time, the airbag cushion 100 and the inflator 300 are assembled doubly by the fixed member 700, thereby preventing the airbag cushion 100 from separating from the inflator 300.

Eighth Exemplary Embodiment

Figure 9:
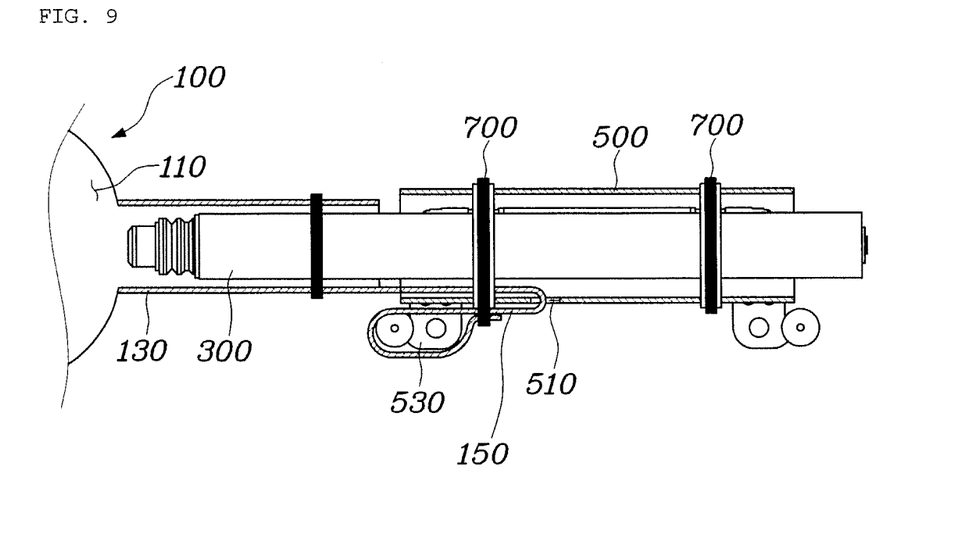

As illustrated in FIG. 9, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed under the inlet 130 and is inserted between the inflator 300 and the bracket 500 and then penetrates through the first through hole 510. Next, the first extending part 150 is again bent forward to be wound around a coupling part 530 coupled with the vehicle body with which the bracket 500 is coupled and fixed to the coupling part 530, thereby increasing the assembling force between the inflator 300 and the airbag cushion 100.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the first extending part 150 disposed at the outside of the inflator 300, the bracket 500 disposed at the outside of the first extending part 150, and the first extending part 150 bent from the outside of the bracket 500, enclosing the inflator 300, the first extending part 150, the bracket 500, and the first extending part 150 from the outermost side, and the fixed member 700 at the rear side fixes the inflator 300 and the bracket 500 supporting the inflator 300, enclosing the inflator 300 and the bracket 500 from the outermost side to increase the assembling force between the inflator 300 and the airbag cushion 100, thereby preventing the airbag cushion 100 from separating from the inflator 300 when the airbag cushion 100 is unfolded.

Ninth Exemplary Embodiment

Figure 10:
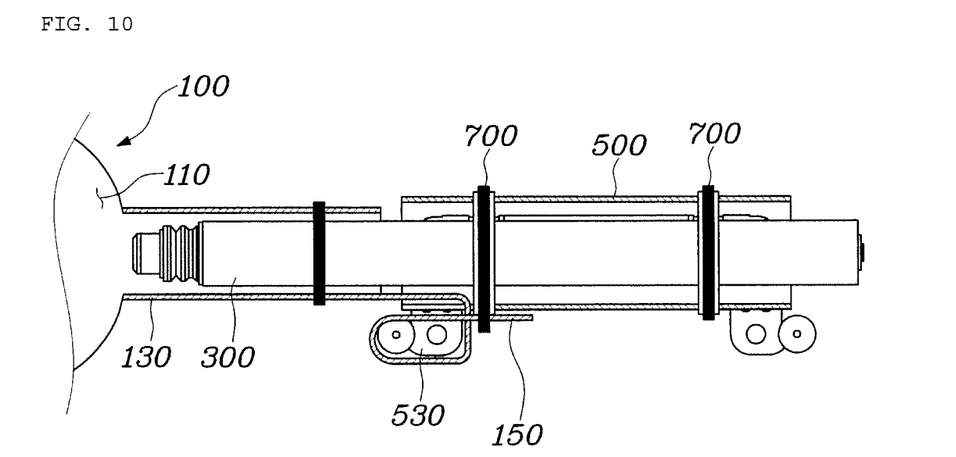

As illustrated in FIG. 10, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. The first extending part 150 having a predetermined length and width is disposed under the inlet 130 and the first extending part 150 is wound around the coupling part 530 coupled with the vehicle body to which the bracket 500 is fixed and fixed to the coupling part 530, thereby increasing the assembling force between the inflator 300 and the airbag cushion 100.

As described in the first exemplary embodiment, an example in which the fixed member 700 is disposed at three positions of the front side, the central side, and the rear side will be described. Therefore, the fixed member 700 at the front side fixes the inflator 300 and the inlet 130 disposed at the outside of the inflator 300, enclosing the inflator 300 and the inlet 130 from the outermost side, the fixed member 700 at the central side fixes the inflator 300, the bracket 500 disposed at the outside of the inflator 300, an end of the first extending part 150 extending to be wound around the coupling part 530 and then extending backward, enclosing the inflator 300, the bracket 500, and the end of the first extending part 150 from the outermost side, and the fixed member 700 at the rear side fixes the inflator 300 and the bracket 500 supporting the inflator 300, enclosing the inflator 300 and the bracket 500 from the outermost side to increase the assembling force between the inflator 300 and the airbag cushion 100, thereby preventing the airbag cushion 100 from separating from the inflator 300 when the airbag cushion 100 is unfolded.

Further, the fixed member 700 at the central side may also be formed to implement the more firm assembling so that the first extending part 150 is first positioned at the outsides of the inflator 300 and the bracket 500 and then extends backward again, being wound around the coupling part 530 to position the end of the first extending part 150 at the outermost side and wind the first extending part 150 doubly.

Tenth Exemplary Embodiment

Figure 11:
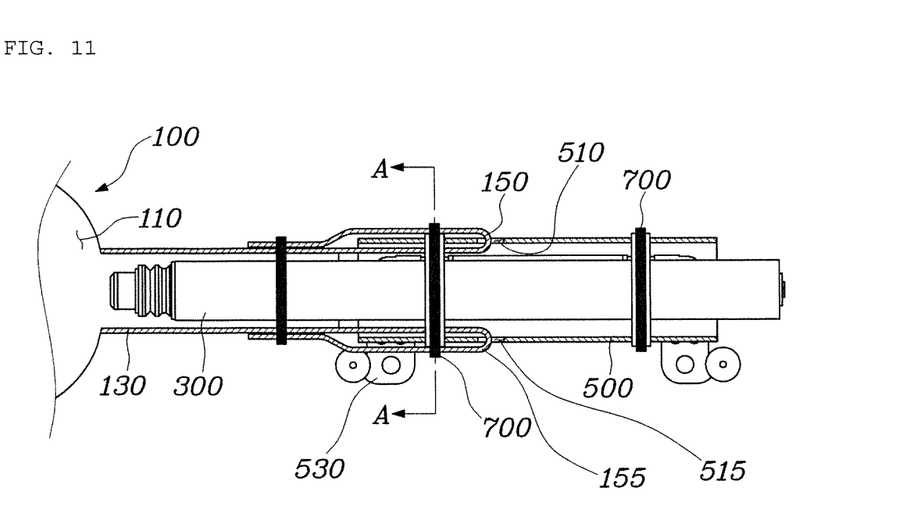
Figure 12:
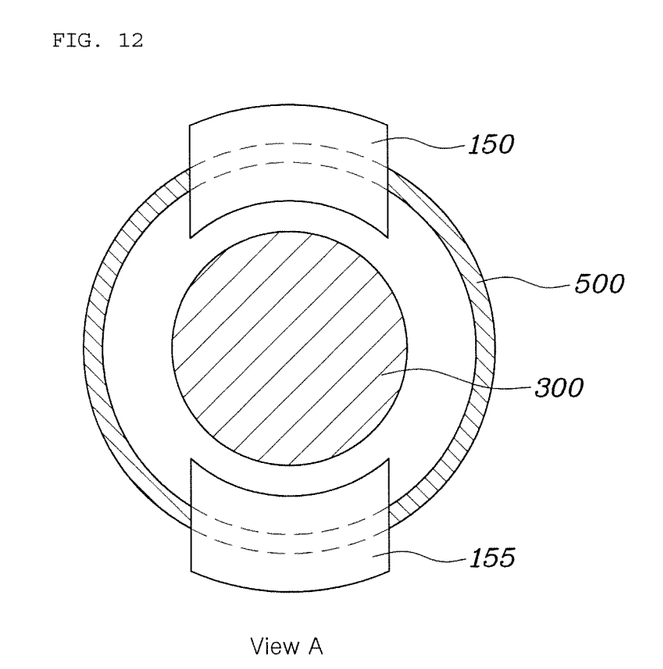

As illustrated in FIGS. 11 and 12, one side of the body part 110 of the airbag cushion 100 is provided with the inlet 130, the inlet 130 has the inflator 300 inserted thereinto, and the inflator 300 is supported by the bracket 500 at the outside of the inlet 130. That is, the inlet 130 has the inflator 300 inserted thereinto but does not have the bracket 500 inserted thereinto. First and second extending parts 150 and 155 having predetermined lengths and widths are formed over and under the inlet 130. Further, first and second through holes 510 and 515 of the bracket 500 are also each positioned over and under the inlet 130. Therefore, the first and second extending parts 150 and 155 are inserted between the inflator 300 and the bracket 500, penetrate through the first and second through holes 510 and 515 each corresponding thereto, and are then bent forward. The bent first and second extending parts 150 and 155 are fixed simultaneously by the fixed member 700, thereby increasing the assembling force between the airbag cushion 100 and the inflator 300.

As described in the first exemplary embodiment, certain embodiments in which the fixed member 700 is disposed at three positions of the front side, the central side, and the rear side will be described. Therefore, in certain embodiments, the fixed member 700 at the front side encloses and fixes the inflator 300, the inlet 130 disposed at the outside of the inflator 300, and the first and second extending parts 150 and 155 disposed over and under the inlet 130. In certain embodiments, the fixed member 700 at the central side encloses and fixes the inflator 300, the first extending part 150 disposed at the outside of the inflator 300, the bracket 500 disposed at the outside of the first extending part 150, and the portions of first and second extending parts 150 and 155 that are bent from the outside of the bracket 500. A cross section is illustrated in FIG. 12. In certain embodiments, the fixed member 700 at the rear side encloses and fixes the inflator 300 and the bracket 500 supporting the inflator 300.

Further, among the shapes described as the example in the above first to tenth exemplary embodiments, the first through hole 510 of the bracket 500 may be formed to penetrate through the bracket 500 which is integrally formed as illustrated in FIGS. 2 to 12. However, in certain embodiments, the first through hole 510 is formed by a gap between multiple brackets 500 and the formed gap may be used as the first through hole 510. For example, when two brackets are provided, the bracket 500 is configured of a first bracket in front of the inflator 300 and a second bracket in back of the inflator 300 and a gap between the first bracket and the second bracket may form the first through hole 510. In certain embodiments, the second through hole 515 may also be formed by a gap between two brackets 500.

In addition, the first extending part 150 may be formed by extending over a portion of an outer peripheral surface of the inlet 130 as described above so that the first extending part 150 has a predetermined length and width. Alternatively, in certain embodiments, the first extending part 150 may also be formed by extending the whole outer peripheral surface of the inlet 130. Therefore, the first extending part 150 may be formed to enclose the outside of the inflator 300 by penetrating through the first through hole 510 inside the bracket 500, which may be changed by those skilled in the art without limit depending on the design or the environment. The plurality of fixed members 700 may also be provided at the outsides of the inflator 300 and the bracket 500, being spaced apart from each other, if necessary.

The assembling apparatus of a curtain airbag as described above is provided with the inlet which is formed at one side of the airbag cushion to inject air. The inlet has the inflator inserted thereinto and the inflator is supported by the bracket at the outside of the inlet. That is, in certain embodiments, the inlet has the inflator inserted thereinto but does not have the bracket inserted thereinto. In certain embodiments, the first extending part having a predetermined length and width is disposed over the inlet, inserted between the inflator and the bracket, penetrates through the first through hole, and then fixed by the fixed member to increase the assembling force between the airbag cushion and the inflator.

By the above manner, when the airbag cushion is assembled with the inflator, the first extending part of the airbag cushion adheres face-to-face between the inflator and the bracket, thereby increasing the binding force. Further, the fixed member may be provided in plural if necessary without regard to the position, thereby more firmly assembling the airbag cushion with the inflator over the related art. Therefore, the airbag cushion may be rapidly and stably operated at the time of the collision, thereby safely protecting passengers from a risk.

Further, even though the airbag cushion is expanded by the inflator due to the instant pressure generated when the airbag cushion is unfolded, the bracket is fixed to the vehicle body, the inflator is fixed to the bracket, and the airbag cushion penetrates through the first through hole via the gap between the inflator and the bracket and is then supported by the fixed member, thereby preventing the airbag cushion from separating from the inflator by the pressure. Further, the bracket which is the steel member is not directly inserted into the inlet of the airbag cushion, thereby preventing the airbag cushion from being damaged due to the bracket.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An assembling apparatus of a curtain airbag in a vehicle, the apparatus comprising:
 an inflator;
 an airbag cushion including a body part configured to be unfolded if necessary to protect a passenger, an inlet configured to transmit air from the inflator into the body part, the inlet having a body part side and an opposing inflator side, and a first extending part having a predetermined length extending from the inlet towards the inflator side;
 at least one bracket on which the inflator is supported; and
 at least one fixed member configured to fix the inflator, enclosing an outside of the inflator, wherein the at least one bracket includes a first bracket in front of the inflator and a second bracket in back of the inflator, and a first through hole is formed by a gap between the first bracket and the second bracket.

2. The assembling apparatus of claim 1, wherein the first extending part of the airbag cushion penetrates the first through hole.

3. The assembling apparatus of claim 2, wherein the first extending part penetrates the first through hole via a gap between the inflator and the bracket and is bent towards the body part to be fixed to the inflator by the fixed member.

4. The assembling apparatus of claim 2, wherein the first extending part penetrates the first through hole via a gap between the inflator and the bracket, an end of the first extending part is bent by a predetermined length, and the bent portion is sewn to form a thickness increasing part having a predetermined thickness.

5. The assembling apparatus of claim 2, wherein the first extending part extends over the whole outer peripheral surface of the inlet.

6. The assembling apparatus of claim 1, wherein the airbag cushion further includes a second extending part, the first and second extending parts are disposed on opposing sides of the inflator, and the first through hole and a second through hole corresponding to the first and second extending parts are each disposed on opposing sides of the bracket, wherein the first extending part penetrates through the first through hole and is bent towards the body part, the second extending part penetrates through the second through hole and is bent towards the body part, and the first and second extending parts are simultaneously fixed by the fixed member.

7. The assembling apparatus of claim 1, wherein the bracket includes a coupling part coupling the bracket to a body of the vehicle, the first extending part is disposed under the inflator, the first through hole is disposed under the bracket, and the first extending part penetrates the first through hole via a gap between the inflator and the bracket and is fixed by being wound around the coupling part of the bracket.

8. The assembling apparatus of claim 1, wherein the bracket includes a coupling part coupling the bracket to a body of the vehicle, and the first extending part is disposed under the inflator and is fixed by being wound around the coupling part of the bracket.

9. The assembling apparatus of claim 1, wherein the at least one fixed member includes two or more fixed members spaced apart from each other.

10. The assembling apparatus of claim 9, wherein the two or more fixed members are three fixed members.

\* \* \* \* \*